(12) United States Patent
Suzuki et al.

(10) Patent No.: US 10,146,256 B2
(45) Date of Patent: Dec. 4, 2018

(54) ELECTRONIC DEVICE SYSTEM, ELECTRONIC DEVICE COVER, AND ELECTRONIC DEVICE

(71) Applicant: LENOVO (Singapore) PTE. LTD., New Tech Park (SG)

(72) Inventors: Takayuki Suzuki, Yokohama (JP); Takehito Yamauchi, Ebina (JP); Keita Ishikawa, Kawasaki (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/217,638

(22) Filed: Jul. 22, 2016

(65) Prior Publication Data
US 2017/0024026 A1 Jan. 26, 2017

(30) Foreign Application Priority Data
Jul. 24, 2015 (JP) .................. 2015-147048

(51) Int. Cl.
*G06F 1/16* (2006.01)
*G09G 5/00* (2006.01)

(52) U.S. Cl.
CPC .......... *G06F 1/1635* (2013.01); *G06F 1/1626* (2013.01); *G06F 1/1656* (2013.01); *G06F 1/1677* (2013.01); *G09G 5/003* (2013.01); *G09G 2330/00* (2013.01)

(58) Field of Classification Search
CPC .... G06F 1/1635; G06F 1/1626; G06F 1/1656; G06F 1/1677; G09G 5/003; G09G 2330/00; A45C 2011/002
See application file for complete search history.

(56) References Cited

U.S. PATENT DOCUMENTS

| | | | |
|---|---|---|---|
| 6,149,001 A * | 11/2000 | Akins | A45C 13/26 150/165 |
| 6,438,248 B1 * | 8/2002 | Kamimura | H04M 1/05 381/374 |
| 7,643,288 B2 | 1/2010 | Langgood et al. | |
| 9,438,295 B1 * | 9/2016 | Song | H04B 1/3888 |
| 9,800,700 B2 * | 10/2017 | Kwon | H04M 1/0266 |
| 2014/0202888 A1 * | 7/2014 | Lieblein | A45C 11/00 206/45.23 |

(Continued)

FOREIGN PATENT DOCUMENTS

| | | |
|---|---|---|
| JP | 2012110631 | 6/2012 |
| WO | 2014/042772 A1 | 3/2014 |

*Primary Examiner* — Erin M File
(74) *Attorney, Agent, or Firm* — Kunzler, PC (57) ABSTRACT

Disclose is an electronic device system that includes an electronic device having a display unit on at least one surface, a detector, and a controller. The system includes a cover that is selectively attachable to the electronic device. The cover includes a cover assembly that closes to cover the display unit and opens to expose the display unit when the cover is attached to the electronic device. The cover includes a window of the cover assembly that exposes a portion of the display unit in response to the window being in an open state and the cover being closed. The controller causes the display unit to display device information associated with the electronic device at the portion of the display unit that is exposed by the window in response to the detector detecting that the window is in an open state.

20 Claims, 8 Drawing Sheets (56) References Cited

U.S. PATENT DOCUMENTS

| | | | |
|---|---|---|---|
| 2014/0268517 A1* | 9/2014 | Moon | H05K 7/00 |
| | | | 361/679.01 |
| 2015/0278529 A1* | 10/2015 | Cho | G06F 1/1677 |
| | | | 345/668 |
| 2015/0346779 A1* | 12/2015 | Chae | G06F 1/1677 |
| | | | 715/773 |
| 2016/0259377 A1* | 9/2016 | Hoellwarth | B29C 45/14639 |
| 2017/0034337 A1* | 2/2017 | Alameh | H04M 1/72575 |
| 2017/0205459 A1* | 7/2017 | De Rai | G01R 31/083 |

* cited by examiner

ELECTRONIC DEVICE SYSTEM, ELECTRONIC DEVICE COVER, AND ELECTRONIC DEVICE

The subject matter disclosed herein relates to device covers and more particularly to an electronic device system, an electronic device cover, and an electronic device.

BACKGROUND

Some device cover accessories allow a display section of an electronic device to be selectively opened or closed. A user may open a cover to expose the display section when using the electronic device and close the cover to protect the display section when not using the electronic device. A user may wish to check information regarding his or her electronic device while keeping the cover thereof closed.

SUMMARY

The present disclosure provides an electronic device system that includes an electronic device having a display unit on at least one surface, a detector, and a controller. The system includes a cover that is selectively attachable to the electronic device. The cover includes a cover assembly that closes to cover the display unit and opens to expose the display unit when the cover is attached to the electronic device. The cover includes a window of the cover assembly that exposes a portion of the display unit in response to the window being in an open state and the cover being closed. The controller causes the display unit to display device information associated with the electronic device at the portion of the display unit that is exposed by the window in response to the detector detecting that the window is in an open state.

According to one embodiment, the device information includes information regarding a battery charge remaining of the electronic device, information regarding whether a battery of the electronic device is being charged, or information regarding arrival of one or more emails.

According to one embodiment, the cover includes a cable for connecting the electronic device and an external device, and the cable includes a first connector for connection with the external device, the first connector being formed at the window, and a second connector for connection with an external input terminal of the electronic device.

According to another embodiment, the first connector is formed on a surface disposed on the side opposite the display unit in a state in which the window is closed, the first connector being exposed in a state in which the window is opened. According to one embodiment, the external device includes a charging device. In one embodiment, the external input terminal includes a dedicated external input terminal or a general-purpose external input terminal.

In another embodiment, the detector detects that the window is in an open state in response to detecting that the external device is connected to the cable.

The present disclosure provides an apparatus that includes a cover assembly that closes to cover a display unit of an electronic device and opens to expose the display unit when the cover assembly is attached to the electronic device, and a window of the cover assembly that exposes a portion of the display unit in response to the window being in an open state and the cover being closed. The display unit of the electronic device displays information associated with the electronic device at a portion of the display unit that is exposed by the window in response to the window being in an open state.

In one embodiment, the portion of the display unit exposed in response to the window of the apparatus being in an open state displays device information. The device information may include information regarding a battery charge remaining of the electronic device, information regarding whether a battery of the electronic device is being charged or information regarding arrival of one or more emails.

According to one embodiment, the cover further includes a cable for selectively connecting the electronic device with an external device. The cable has a first connector for connection with the external device, the first connector being formed at the window, and a second connector for connection with an external input terminal of the electronic device.

In one embodiment, the first connector is formed on a surface disposed on the side of the electronic device opposite the display unit in a state in which the window is closed and the first connector is exposed in a state in which the window is open. In one embodiment, the external device includes a charging device. In one embodiment, the external input terminal may include a dedicated external input terminal or a general-purpose external input terminal.

In one embodiment, the electronic device includes a detector that detects that the window is in an open state in response to detecting that the external device is connected to the cable.

The present disclosure provides an electronic device that includes a display unit on at least one surface of the electronic device and to which a cover is selectively attachable. The cover includes a cover assembly that closes to cover the display unit and opens to expose the display unit. The cover includes a window of the cover assembly that exposes a portion of the display unit in response to the window being in an open state and the cover being in a closed state. The electronic device further includes a detector that detects that the window is in an open state, and a controller that causes display unit to display device information regarding the electronic device at the portion of the display unit exposed by the window in response to the window is being in an open state.

In on embodiment, the device information includes information regarding the battery charge remaining of the electronic device, the information regarding whether a battery of the electronic device is being charged, or the information regarding the arrival of one or more emails.

BRIEF DESCRIPTION OF THE DRAWINGS

A more particular description of the embodiments briefly described above will be rendered by reference to embodiments that are illustrated in the drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

The following describes an electronic device system, an electronic device cover, and an electronic device according to the present embodiments. The constituent elements of the embodiments are generally illustrated in the accompanying drawings of the present specification. However, it can be easily understood that the constituent elements may be designed to be in various configurations and laid out in a variety of ways. Therefore, the embodiments of devices, methods and programs according to the embodiments described below in further detail are to be construed merely as selected embodiments and examples illustrative of the present disclosure rather than limiting the scope of the present disclosure indicated by the claims. The selected embodiments of a device, a system and a program are merely illustrative without conflicting with the present disclosure indicated by the claims of the present specification. It can be understood that persons skilled in the art will be able to implement the present disclosure even if one or more specific details are missing, or by using other methods, components or materials.

Figure 1:
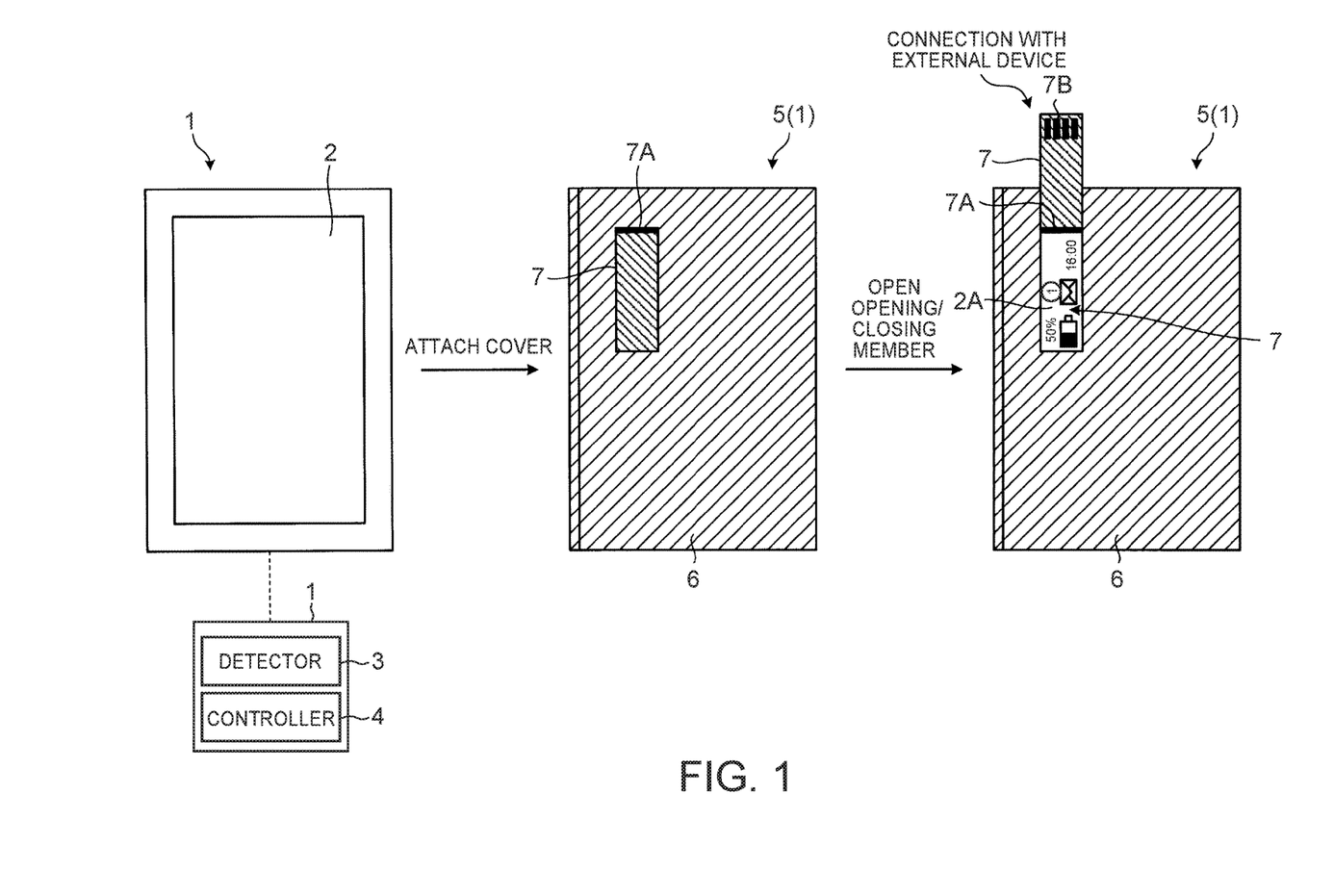
FIG. 1 is a schematic diagram illustrating one embodiment of an electronic device system.

FIG. 1 is a schematic diagram illustrating one embodiment of an electronic device system. As illustrated in FIG. 1, in one embodiment, the electronic device system includes an electronic device 1 and a cover 5. The electronic device 1 may include an electronic device such as a smartphone, a tablet PC, or a game terminal, which may include a display unit 2 on at least one surface thereof.

In some embodiments, a cover 5 is selectively attachable to the electronic device 1. In one embodiment, the cover 5 includes a cover assembly 6 that closes to cover the display unit 2 and opens to expose the display unit 2. In response to closing or opening the cover assembly 6, the cover assembly 6 may cover or expose at least one surface of the electronic device 1. In one embodiment, the cover assembly 6 includes a window 7 of the cover assembly 6 that exposes a portion of the display unit 2 in response to the window 7 being in an open state and the cover 5 being closed.

The window 7 can be configured to cover or expose a portion 2A of the display unit 2 of the electronic device 1. The window 7 may be openable and closable, for example, by folding back, swinging, or linearly moving the window 7. In the example illustrated in FIG. 1, in one embodiment, the window 7 may be configured to be capable of being folded back (swingable) at a fold-back line 7A with respect to the cover assembly 6.

In one embodiment, the electronic device 1 includes the display unit 2 disposed on the front surface and a detector 3 for detecting that the window 7 of the cover 5 is in an open state. The electronic device 1 may include a controller 4 that causes device information 9 regarding the electronic device 1 to be displayed at the portion 2A of the display unit 2 exposed by the window in response to the detector 3 detecting that the window 7 of the cover 5 is in an open state.

In some embodiments, the display unit 2 may include a touch panel that includes a display device, such as an LCD display, or an organic EL device, and a touch input device, such as a touch sensor. The detector 3 and the controller 4 may include one or more modules or combinations of modules of hardware and software such as operating systems (OSs), such as Windows (registered trademark), iOS (registered trademark) and Android (registered trademark), application program interfaces (APIs), services, utilities, libraries, drivers, and programs such as applications.

In one embodiment, the device information 9 displayed at the portion 2A of the display unit 2 may include information regarding battery charge remaining of the electronic device 1, information regarding whether the battery of the electronic device 1 is being charged, or information regarding the arrival of one or more emails. In some embodiments, the device information 9 may further include the information regarding a software or application (app) update, the information regarding new simple notification service (SNS) notifications, new phone calls, time information, or the like.

In certain embodiments, the cover 5 may include a cable (not illustrated) for connecting the electronic device 1 with an external device. The cable may include a first connector 7B that is formed at the window 7. In some embodiments, the first connector may be formed at the window 7 for the connection with an external device. The cable may include a second connector (not illustrated) for the connection with an external input terminal of the electronic device 1. The cable may selectively connect the electronic device 1 and the external device.

In one embodiment, the first connector 7B may be formed on the surface disposed on a side opposite the display unit 2 in a state in which the window 7 is closed and the first connector may be exposed in a state in which the window 7 is open, as illustrated in FIG. 1.

In some embodiments, the external input terminal of the electronic device 1 may include a dedicated or general-purpose external input terminal. The general-purpose external input terminal may include an external input terminal in conformance with a versatile standard, such as a USB, a micro USB, a USB-C, an HDMI (registered trademark), a micro HDMI (registered trademark), a DVI, or Lightning.

The external device to be connected to the first connector 7B may include a peripheral device, such as a charging device (including a portable charging accessory, an AC/DC adapter, or a laptop PC to which charging power can be supplied), a terminal device, a camera, or a printer.

In some embodiments, methods for detecting the opening and the closing of the window 7 of the cover 5 may include, for example, the following methods. In one embodiment, a magnet may be disposed on the window 7, and a Hall element may be disposed at a position on the electronic device 1. The position corresponds to the position of the magnet in response to the window 7 being closed. The detector 3 may detect the opening and the closing of the window 7 by detecting a change in the magnetic force through the Hall element. In one embodiment, a contact switch configured to detect opening and the closing the window 7 may be disposed on the cover assembly 6 of the cover 5 and/or the window 7, and the detector 3 receives an ON/OFF signal of the contact switch through, for example, the foregoing second connector to detect the opening and the closing of the window 7. In one embodiment, if an external device connects to the first connector 7B of the window 7, then the window 7 may be open. The detector 3 may detect the opening of the window 7 in response to detecting the connection of the external device through a cable (i.e., the first connector 7B and the second connector).

In one embodiment, the electronic device system may include the electronic device 1 that may include the display unit 2 on at least one surface thereof. The electronic device system may include the cover 5 that is selectively attachable to the electronic device 1. The cover 5, in one embodiment, includes the cover assembly 6 and the cover assembly 6 may be capable of opening and closing on at least one surface of the electronic device 1. The cover 5 includes the window 7 of the cover assembly 6. In some embodiments, the window 7 is formed to be openable and closable. Opening the window 7 may expose a portion of the display unit 2 and closing the window 7 may cover the portion of the display unit 2. The electronic device 1 includes the detector 3 that detects that the window 7 is opened. The electronic device 1 includes the controller 4 that causes the device information 9 regarding the electronic device 1 to be displayed on the portion 2A of the display unit 2 that is exposed in response to the detector 3 detecting that the window 7 is opened. Thus, even when the cover assembly 6 is closed, a user may easily check the device information 9 regarding the electronic device 1 by opening the window 7.

Further, according to one embodiment, the device information 9 includes information regarding the battery charge remaining of the electronic device 1, information regarding whether the battery of the electronic device 1 is being charged, or information regarding the arrival of one or more emails. This may enable the user to access the information regarding the battery charge remaining of the electronic device 1, the information regarding whether the battery is being charged, or the information regarding the arrival of new emails.

Further, in one embodiment, the cover 5 includes the cable for connecting the electronic device 1 and the external device. In one embodiment, the cable includes the first connector 7B, which may be formed at the window 7 for the connection with the external device. In one embodiment, the cable includes the second connector for the connection with the external input terminal of the electronic device 1. This may enable the user to connect the electronic device 1 with the external device without a separate cable.

Further, according to one embodiment, the first connector 7B is formed on the surface disposed on an opposite side of the display unit 2 in response to the window 7 being in a closed state, and configured to be exposed in response to the window 7 being in an open state. Hence, the first connector 7B may not be exposed in response to the window 7 being in the closed, thus, in some embodiments, making it possible to reduce the wear on the first connector 7B.

Further, in one embodiment, the external device includes a charging device. The battery of the electronic device 1 can be charged by connecting the charging device through the cover 5.

Further, in some embodiments, the external input terminal of the electronic device 1 includes a dedicated external input terminal or a general-purpose external input terminal. This may allow the electronic device 1 to connect with the external device through the dedicated or general-purpose external input terminal and the cover 5.

Further, according to one embodiment, the detector 3 is adapted to detect that the window 7 is in an open state. In response to the detector 3 detecting that the external device is connected to the cable, for example, in some embodiments, to the first connector 7B of the cover 5. This may eliminate the need for providing the cover 5 with a separate mechanism for detecting the opening and closing of the window 7, thus making it possible to detect the opening and the closing of the window 7 by a another method.

In one or more of the present embodiments, the description has been given of the example in which the electronic device 1 is charged through the external charging device. In another embodiment, a charging device may be built in the cover 5 to charge the battery of the electronic device 1 by contact or noncontact charging (wireless charging).

Figure 2A:
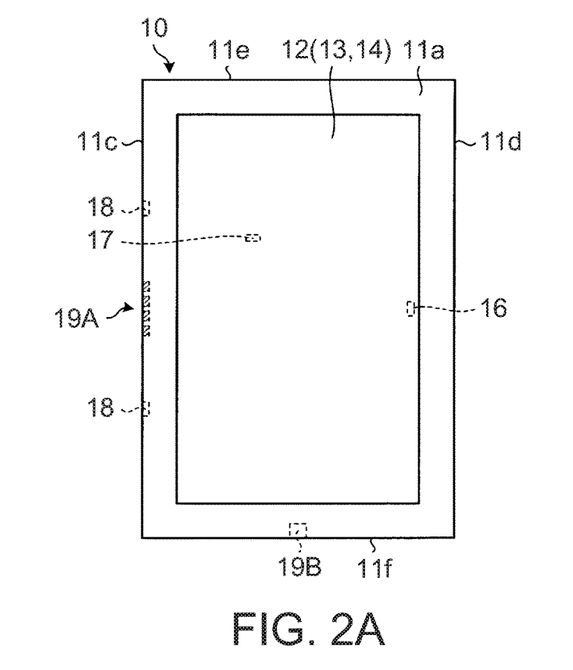
FIG. 2A is a front view illustrating one embodiment of an electronic device.
Figure 2B:
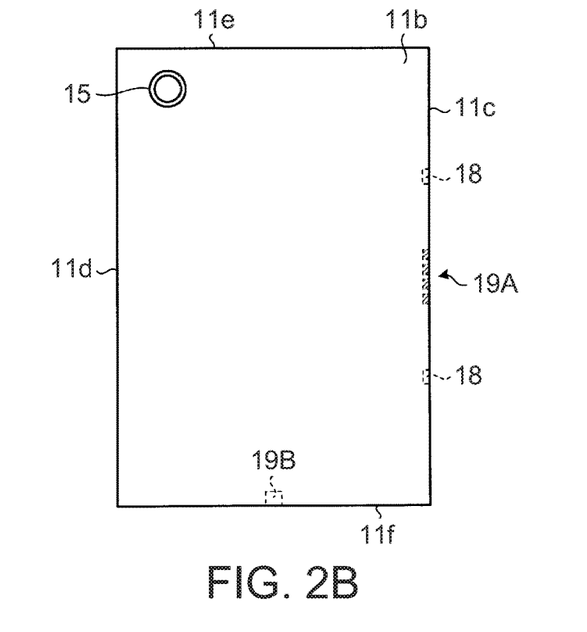
FIG. 2B is a back view another embodiment of an electronic device.

FIG. 2A is a front view illustrating one embodiment of an electronic device. FIG. 2B is a back view illustrating one embodiment of the electronic device. The electronic device may include a tablet PC 10. In some embodiments, the tablet PC 10 includes a chassis 11, which may include a substantially rectangular shape as observed in a front view and includes a front surface 11a, a rear surface 11b, a pair of side surfaces 11c and 11d in a longitudinal direction, and a pair of side surfaces 11e and 11f in a lateral direction. The chassis 11 may include, for example, a synthetic resin or a metal such as aluminum. A display unit 12 is disposed on the front surface 11a of the chassis 11. The display unit 12 may include a touch display unit. The display unit 12 may include a display section 13 and a touch sensor 14 disposed on the display section 13. The display unit 12 may be disposed on at least one surface of the tablet PC 10. A cover (such as the cover 5 described above) may selectively attach to the display unit 12. The cover may include a cover assembly that closes to cover the display unit 12 and opens to expose the display unit 12 when the cover is attached to the tablet PC 10. The cover may include a window of the cover assembly that exposes a portion of the display unit 12 in response to the window being in an open state and the cover being in a closed state.

In one embodiment, the device information may include information regarding a battery charge remaining of the tablet PC 10, information regarding whether a battery of the tablet PC is being charged, or information regarding the arrival of one or more emails.

A variety of types of information may be displayed on the display section 13. The touch sensor 14 may include a multi-touch pad capable of simultaneously detecting a plurality of fingers and may include, for example, a capacitance touch sensor. The touch sensor 14 may be configured to be capable of detecting a touch position, for example, (X, Y). The chassis 11 accommodates therein a circuit board with electronic components mounted thereon, a power circuit (e.g. a battery), and the like.

A camera 15 may be disposed at the top left corner of the rear surface 11b of the chassis 11. Further, a first Hall sensor 16 for detecting the opened state and the closed state of a cover assembly 22 of the tablet PC cover 20 of FIG. 3A and a second Hall sensor 17 for detecting the opened state and the closed state of the window 23 of the cover assembly 22 may be disposed in the chassis 11.

The electronic device may include a detector that detects that a window of a cover is in an open state. The detector may include a detector similar to the detector 3 described above. The detector may include the first Hall sensor 16, the second hall sensor 17, the camera 15, or the like. The electronic device may include a controller. The controller may cause the display unit 12 to display device information regarding the electronic device at the portion of the display unit 12 exposed by the window of the cover in response to the window being in an open state.

The side surface 11c may include a pair of fitting grooves 18 for installing the tablet PC cover 20, and a dedicated external input terminal 19A for the connection with a second connector 29B of a cable window 23 of the tablet PC cover 20. A general-purpose external input terminal 19B may be disposed on the side surface 11d.

In one embodiment, the tablet PC 10 may include a cover (such as the cover 5 described above or the PC tablet cover 20 of FIG. 3A) attached to the tablet PC. The cover may include a cable that selectively connects the tablet PC 10 and an external device. The cable may include a first connector for connection with the external device, the first connector being formed at the window of the cover, and a second connector for connection with an external input terminal of the tablet PC 10. In one embodiment, the first connector is formed on a surface disposed on a side opposite the display unit 12 in a state in which the window of the cover is closed, the first connector being exposed in a state in which the window of the cover is open, and the detector detects that the window is in an open state in response to detecting that the external device is connected to the cable. In one embodiment, the external device may include a charging device.

Figure 3A:
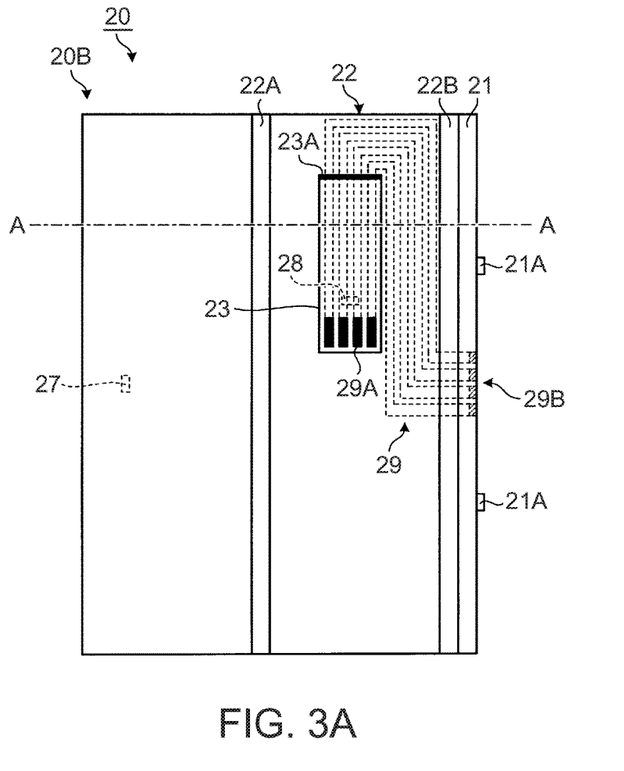
FIG. 3A is a front view illustrating one embodiment of an electronic device system.
Figure 3B:
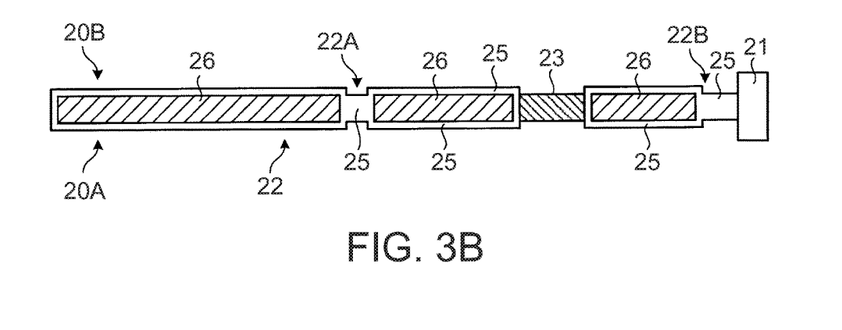
FIG. 3B is a schematic cutaway side view illustrating another embodiment of an electronic device system taken along line A-A in FIG. 3A.

FIG. 3A is a front view illustrating one embodiment of an apparatus. FIG. 3B is a schematic cutaway side view illustrating one embodiment of the apparatus taken along line A-A in FIG. 3A. The apparatus may include a cover assembly 22 that closes to cover a display unit of an electronic device and opens to expose the display unit when the cover assembly 22 is attached to the electronic device. The apparatus may include a window 23 of the cover assembly 22 that exposes a portion of the display unit in response to the window 23 being in an open state and the cover being closed. In one embodiment, the display unit of the electronic device may display information associated with the electronic device at a portion of the display unit that is exposed by the window 23 in response to the window 23 being in an open state. Referring to FIG. 3A and FIG. 3B, in one embodiment, the apparatus may include the tablet PC cover 20. The tablet PC cover 20 includes a front surface 20A and a rear surface 20B and is substantially rectangular as observed in a front view. The tablet PC cover 20 may include an attaching assembly 21 for fixing the tablet PC cover 20 to the side surface 11c of the tablet PC 10, and a cover assembly 22 which may be folded back (swingable) with respect to the attaching assembly 21 (the tablet PC 10) and may selectively cover the front surface 11a or the rear surface 11b of the tablet PC 10. The tablet PC cover 20 may further include a cable 29 for connecting the tablet PC 10 with an external device.

In one embodiment, the attaching assembly 21 may include a pair of protrusions 21A, which may be fitted to the pair of fitting grooves 18 in the side surface 11c of the tablet PC 10 and the second connector 29B of the cable 29. The second connector 29B may be exposed on the end surface of the attaching assembly 21 and connected to the external input terminal 19A of the side surface 11c of the tablet PC 10 in response to the pair of protrusions 21A being fitted to the pair of fitting grooves 18 of the tablet PC 10. The user may couple the tablet PC cover 20 to the tablet PC 10 by fitting the pair of protrusions 21A of the attaching assembly 21 of the tablet PC cover 20 to the pair of fitting grooves 18 in the side surface 11c of the tablet PC 10.

In one embodiment, the cover assembly 22 may include the window 23. The window 23 may close to cover a portion of the display unit 12 and open to expose the portion of the display unit 12 in response to the front surface 11a of the tablet PC 10 remaining covered. The cover assembly 22 may include a first magnet 27 for detecting that the cover assembly 22 is open or closed. The window 23 may be formed to be folded back at a fold-back line 23A with respect to the cover assembly 22. The window 23 may include a first connector 29A of the cable 29 and the first connector 29A may be exposed on the rear surface 20B, and a second magnet 28. The first magnet 27 and the second magnet 28 may be disposed at positions corresponding to the first Hall sensor 16 and the second Hall sensor 17 in response to the cover assembly 22 being closed, covering the front surface 11a of the tablet PC 10.

In some embodiments, in the state in which the cover assembly 22 is open, the first magnet 27 may be positioned away from the first Hall sensor 16 of the tablet PC 10. In the state in which the cover assembly 22 is closed, the first magnet 27 is positioned in the vicinity of the first Hall sensor 16. In one embodiment, the first Hall sensor 16 may detect whether the first magnet 27 is moving toward the first Hall sensor 16 by sensing the magnetic force from the first magnet 27, thus detecting whether the cover assembly 22 is open or closed. The second Hall sensor 17 of the tablet PC 10 may detect whether the second magnet 28 is moving toward the second Hall sensor 17 by sensing the magnetic force from the second magnet 28, thus detecting whether the window 23 is open or closed.

As illustrated in FIG. 3B, in one embodiment, the cover assembly 22 may include a cover member 25 that includes elasticity permitting folding back or the like. The cover member 25 may include, for example, leather, artificial leather, cloth, a rubber material, or a resin. A part of the cover member 25 may include a reinforcement plate 26 and may improve the protection strength for the tablet PC 10. The reinforcement plate 26 may include, for example, a glass epoxy plate. The window 23 may be disposed in a part without the reinforcement plate 26 and may include a rubber material. Parts 22A and 22B without the reinforcement plate 26 may be folded back.

Figure 4A:
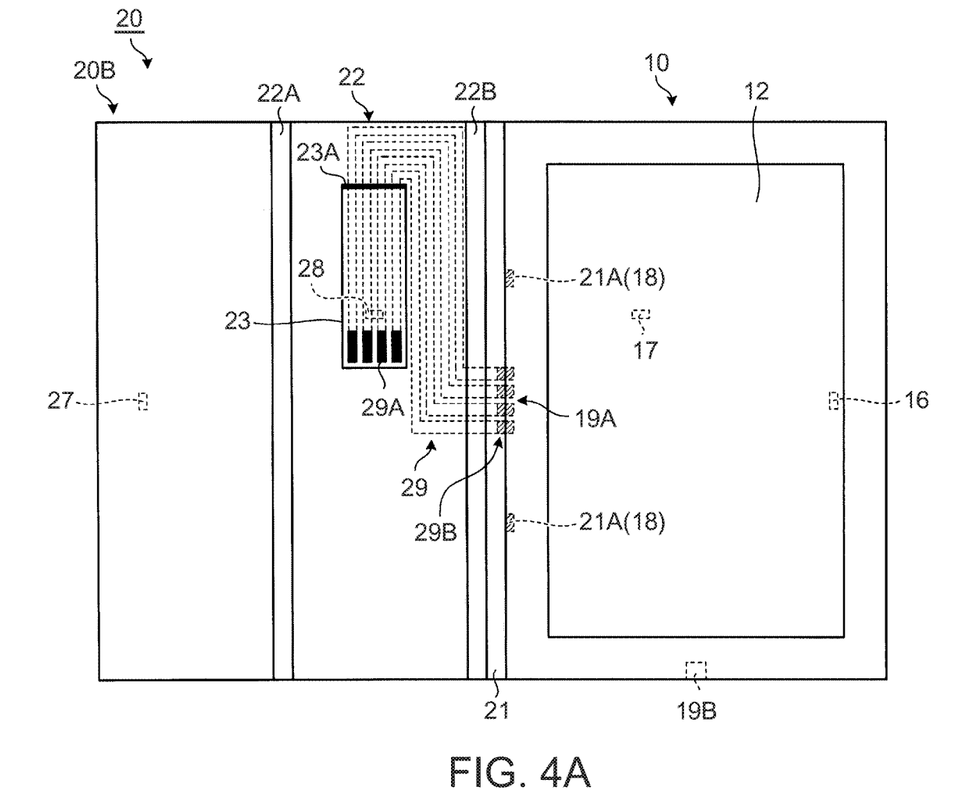
FIG. 4A is a front view illustrating one embodiment of an cover, the cover being opened.
Figure 4B:
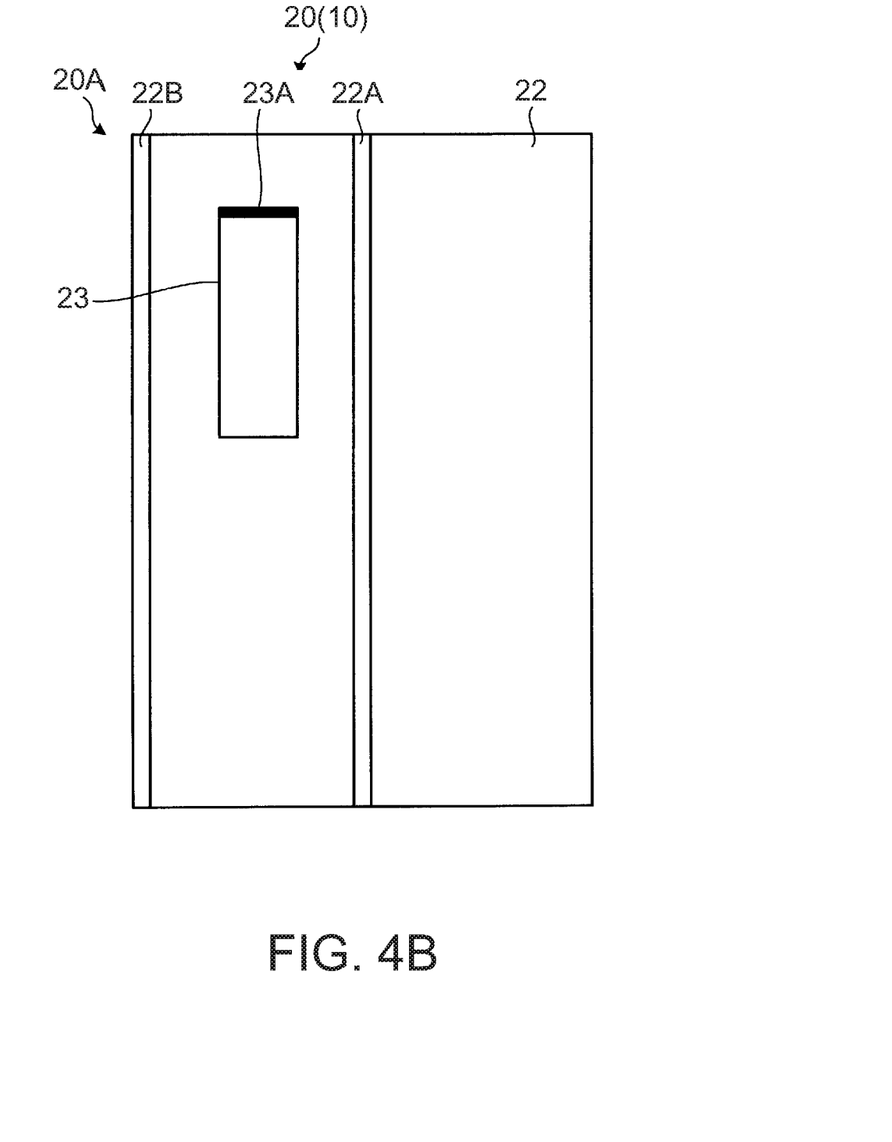
FIG. 4B is a front view illustrating another embodiment of an cover, the cover being closed.
Figure 4C:
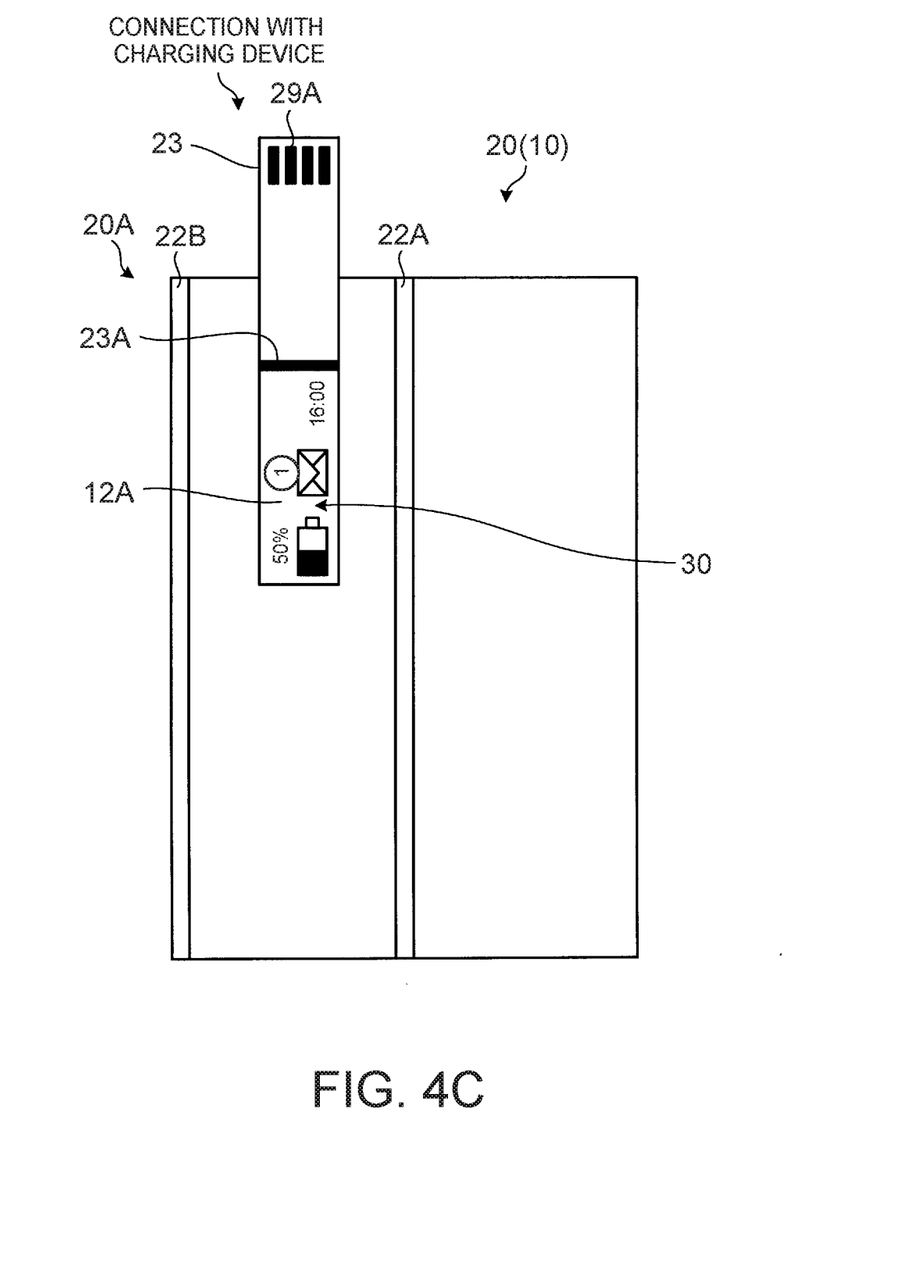
FIG. 4C is a front view illustrating another embodiment of an cover, the window being open and the cover being closed.

FIG. 4A, FIG. 4B, and FIG. 4C illustrate a state in which a tablet PC cover 20 has been attached to a tablet PC 10. FIG. 4A is a front view illustrating one embodiment of an electronic device system. The system may include the cover assembly 22. As depicted in FIG. 4A, the cover assembly 22 is open. In one embodiment, the cover assembly 22 being open is defined as zero degrees.

FIG. 4B is a front view illustrating one embodiment of a cover. In one embodiment, the cover includes the tablet PC cover 20. The tablet PC cover 20 includes the cover assembly 22. As depicted in FIG. 4B, the cover assembly 22 may be turned 180 degrees from the state illustrated in FIG. 4A to cover or close the first surface 11a of the tablet PC 10. In response to the cover assembly 22 being closed and the display unit 12 being active, the tablet PC 10 may cause the display unit 12 to go into hibernation.

FIG. 4C is a front view illustrating one embodiment of an electronic device system, the window being open and the cover being closed. In one embodiment, the cover may include the tablet PC cover 20. In one embodiment, the window may include the window 23. As depicted in FIG. 4C, the window 23 may be opened from the state illustrated in FIG. 4B. In response to detecting that the window 23 is open, the tablet PC 10 may activate the touch display unit 12 to display device information 30 regarding a device at a portion 12A of the touch display unit 12 that is exposed. The tablet PC 10 may activate the whole touch display unit 12 or activate only the portion 12A of the touch display unit 12 that is exposed.

An external device and the tablet PC 10 can connect through the cable 29 of the tablet PC cover 20 by connecting the external device to the first connector 29A of the window 23. The cable 29 may selectively connects the tablet PC 10 and an external device. The first connector 29A may be formed at the window 23. The cable 29 may include a second connector for connection with an external input terminal of the tablet PC 10.

In one embodiment, the first connector 29A may be formed on a surface disposed on a side of the table PC 10 opposite the display unit of the tablet PC 10 in a state in which the window 23 is closed and the first connector 29A is exposed in a state in which the window 23 is open. In one embodiment, the external device may include a charging device. In one embodiment, the external input terminal may include a dedicated external input terminal or a general-purpose external input terminal. In one embodiment, the tablet PC 10 may include a detector. The detector may include a detector similar to the detector 3 described above. The detector may detect that the window 23 is in an open state in response to detecting that the external device is connected to the cable 29.

The device information 30 may include information regarding whether the battery of the tablet PC 10 is being charged, battery charge remaining of the tablet PC 10, arrival of one or more emails, an app update, whether an external device is connected, or the like. In the example illustrated in FIG. 4C, the information regarding the battery charge remaining (50%), the arrival of one or more emails, and the current time (16:00) may be displayed as the device information 30. The tablet PC 10 may, for example, display the information regarding whether the battery is being charged by displaying the battery charge remaining in green if the battery is being charged by a charging device connected to the first connector 29A, and display the battery charge remaining in white if the battery is not being charged.

Figure 5:
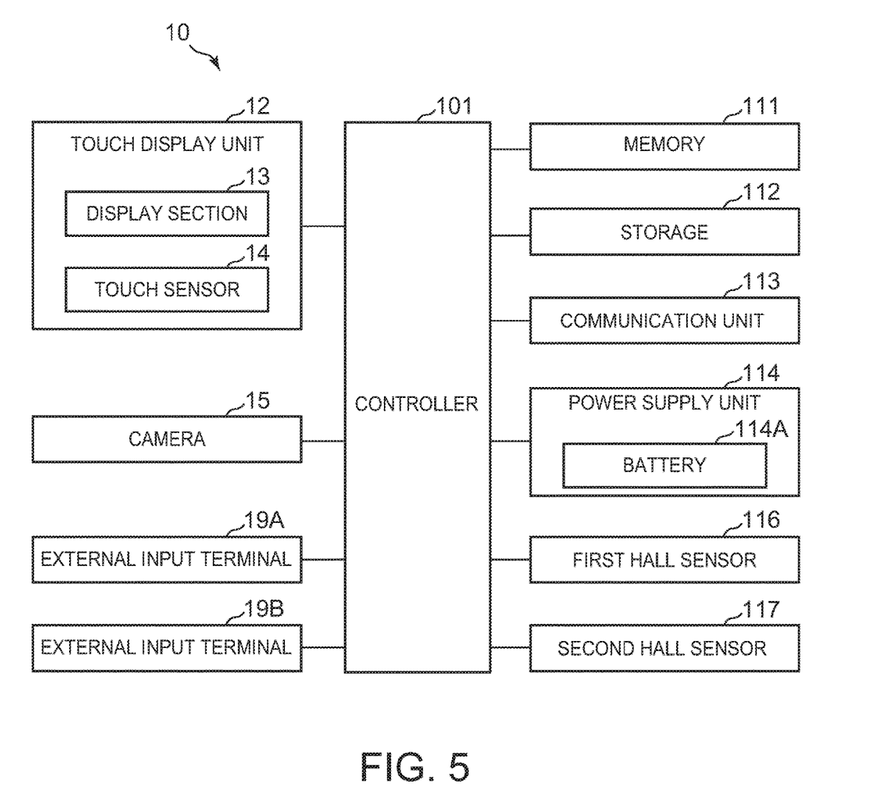
FIG. 5 is a schematic block diagram illustrating another embodiment of an electronic device.

FIG. 5 is a block diagram illustrating another embodiment of an electronic device. The electronic device may include a hardware configuration of the tablet PC 10. As illustrated in FIG. 5, the tablet PC 10 may include a controller 101, a memory 111, a storage 112, the display unit 12, the camera 15, the first Hall sensor 16, the second Hall sensor 17, the external input terminals 19A, 19B, a communication unit 113, and a power supply unit 114.

The display unit 12 may include a touch display unit. The display unit may include the display section 13 and the touch sensor 14 superimposed on the display section 13. The touch sensor 14 detects various types of operations, which may be performed on the touch sensor 14 by fingers or pointers, such as pens, together with the positions on the touch sensor 14 at which the operations have been performed, and notifies the controller 101 of the detection results. The operations detected by the touch sensor 14 may include touch operations, slide operations, or pitch operations. The display section 13 may include a liquid crystal display (LCD display) or an organic electro-luminescence (EL) panel to display characters, figures, or the like according to the control carried out by the controller 101.

The first Hall sensor 16 may detect the magnetic force from the first magnet 27 of the cover assembly 22 of the tablet PC cover 20 and outputs the detection result to the controller 101. The second Hall sensor 17 may detect the magnetic force from the second magnet 28 of the window 23 of the tablet PC cover 20 and outputs the detection result to the controller 101.

The memory 111 may include a RAM, a DRAM, or the like, and may be used as a work area for temporarily storing programs executed by the controller 101, data to which the controller 101 refers, or calculation results or the like of the controller 10.

In some embodiments, the storage 112 includes a computer-readable storage medium retaining the programs executed by the controller 101 and data used by the controller 101. The storage 112 includes a nonvolatile memory, such as a hard disk drive (HDD), an electrically erasable programmable read-only memory (EEPROM), a solid-state drive (SSD), or the like. The storage 112 includes a function to store, for example, an OS for controlling the entire tablet PC 10, various types of hardware drivers for operating hardware, including peripherals, a camera application for implementing a camera function, or other applications (not illustrated) for specific tasks. The other applications may include a browser application, an electronic mail application, a video playback application, a spreadsheet application, or a word processing application.

The communication unit 113 may perform wireless and/or wire communication through various types of networks according to the control by the controller 101.

The power supply unit 114 may include an AC adaptor, a battery 114A, a charging circuit for charging the battery 114A, and a DC/DC converter. The power supply unit 114 may supply power obtained from the battery 114A or the AC adaptor to each section according to the control by the controller 101. The power supply unit 114 may charge the battery 114A by using the power received from a charging device or the AC adaptor according to the control by the controller 101.

The camera 15 may include a lens, an imaging device, such as a charge coupled device (CCD) or a complementary metal-oxide semiconductor (CMOS), a red-green-blue (RGB) color filter, and a signal processing circuit. The camera 15 may convert the light of a subject imaged through the lens into R, G and B analog image signals and then further converts into R, G and B digital image signals, which are output to the controller 101.

In one embodiment, the external input terminal 19A includes a dedicated external input terminal for the tablet PC 10. An external device connected to the first connector 29A of the cable 29 of the tablet PC cover 20 connects to the tablet PC 10 through the external input terminal 19A. The external input terminal 19B may include a general-purpose external input terminal. The general-purpose external input terminal may include an external input terminal in conformance with a versatile standard, such as a USB, a micro USB, a USB-C, an HDMI (registered trademark), a micro HDMI (registered trademark), a DVI, and Lightning.

The controller 101 may include a central processing unit (CPU), a microprocessor, or a DSP, and integrally controls the operation of the tablet PC 10 to implement various functions. The controller 101 refers to the data stored in the storage 112 or the data deployed in the memory 111 to execute instructions included in a program stored in the storage 112, thereby implementing various functions, such as an input function, a screen display function, a communication function, a mailing function, a web browsing function, or the like. The controller 101 may carry out energy saving control on the touch display unit 12 to place the touch display unit 12 in a hibernation mode in response to, for example, no input operation being performed on the touch display unit 12 for a predetermined period of time or the cover assembly 22 of the tablet PC cover 20 being closed and covering the touch display unit 12.

Based, at least in part, on the detection results of the first Hall sensor 16 and the second Hall sensor 17, the controller 101 detects whether the cover assembly 22 of the tablet PC cover 20 and the window 23 are open or closed. Based, at least in part, on the detection result, the controller 101 carries out the processing of partial display for displaying the device information 30 at the portion 12A of the touch display unit 12 that is exposed.

Figure 6:
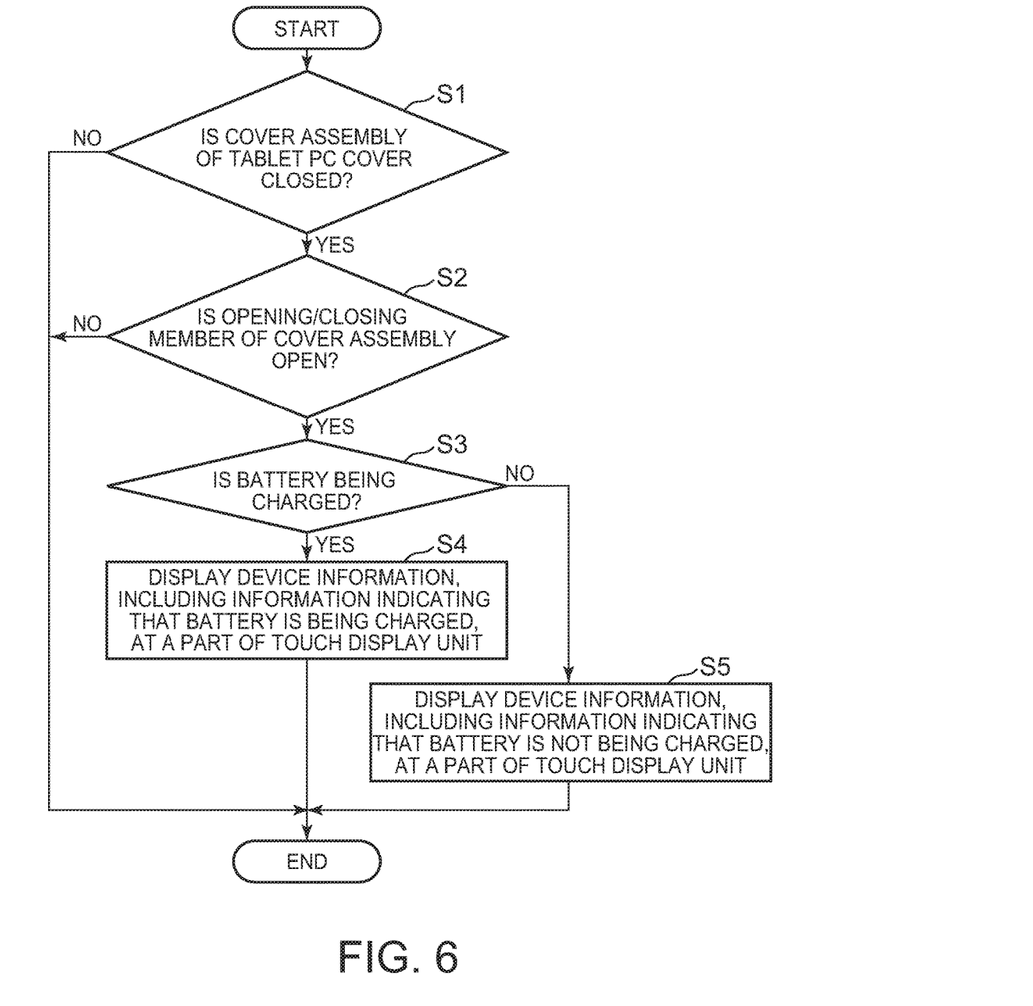
FIG. 6 is a schematic block diagram flowchart illustrating one embodiment of a method of the processing of partial display performed by a controller of an electronic device.

FIG. 6 is a schematic block diagram flowchart illustrating one embodiment of a method of the processing of partial display performed by a controller of an electronic device. The controller may include the controller 101.

In one embodiment, the controller 101 may determine whether the cover assembly 22 of the tablet PC cover 20 is in the closed state on based, at least in part, on a detection result of the first Hall sensor 16 (step S1). If the cover assembly 22 is in the closed state ("Yes" in step S1), then the controller 101 may determine whether the window 23 of the cover assembly 22 is in the opened state based, at least in part, on a detection result of the second Hall sensor 17 (step S2). If the window 23 of the cover assembly 22 is in the opened state ("Yes" in step S2), then the controller 101 may determine whether the battery 114A is being charged (step S3). If the battery 114A is being charged ("Yes" in step S3), then the controller 101 may display the device information 30 at the part 12A of the touch display unit 12 (step S4). The device information 30 may include the information indicating that the battery 114A is being charged. If the battery 114A is not being charged ("No" in step S3), then the controller 101 may display the device information 30 at the part 12A of the touch display unit 12 (step S5). The device information 30 may include the information indicating that the battery 114A is not being charged.

Although the description has been given of the tablet PC as the electronic device in the foregoing example, the present disclosure is not limited thereto. The present disclosure can be applied to other electronic devices, such as a smartphone and a PDA. Further, the present disclosure is not limited to the shape of the electronic device cover in the foregoing example, and can be applied to covers having various other shapes. In addition, the shapes and the number of the windows are not limited to those in the foregoing example.

What is claimed is:

1. A system comprising:
   an electronic device comprising:
      a display unit disposed on at least one surface of the electronic device;
      a detector; and
      a controller; and
   a cover that is selectively attachable to the electronic device, the cover comprising:
      a cover assembly that closes to cover the display unit and opens to expose the display unit when the cover is attached to the electronic device; and
      a window of the cover assembly that exposes a portion of the display unit in response to the window being in an open state and the cover being closed, and covers the portion of the display unit in response to the window being in a closed state and the cover being closed, wherein the cover being selectively attachable to the electronic device comprises the cover being selectively attached to the electronic device or selectively detached from the electronic device, and
   wherein the controller causes the display unit to display device information associated with the electronic device at the portion of the display unit that is exposed by the window in response to the detector detecting that the window is in an open state.

2. The system of claim 1, wherein the device information is selected from the group consisting of:
   information regarding a battery charge remaining of the electronic device;
   information regarding whether a battery of the electronic device is being charged; and
   information regarding arrival of one or more emails.

3. The system of claim 1, wherein:
   the cover comprises a cable that selectively connects the electronic device and an external device; and
   the cable comprises a first connector for connection with the external device, the first connector being formed at the window, and a second connector for connection with an external input terminal of the electronic device.

4. The system of claim 3, wherein the first connector is formed on a surface disposed on a side opposite the display unit in a state in which the window is closed, the first connector being exposed in a state in which the window is open.

5. The system of claim 3, wherein the external device comprises a charging device.

6. The system of claim 3, wherein the external input terminal is selected from the group consisting of:
   a dedicated external input terminal; and
   a general-purpose external input terminal.

7. The system of claim 3, wherein the detector detects that the window is in an open state in response to detecting that the external device is connected to the cable.

8. An apparatus comprising:
   a cover assembly that closes to cover a display unit of an electronic device and opens to expose the display unit when the cover assembly is attached to the electronic device, wherein the cover assembly is selectively attachable to the electronic device or selectively detachable from the electronic device; and
   a window of the cover assembly that exposes a portion of the display unit in response to the window being in an open state and the cover being closed, and covers the portion of the display unit in response to the window being in a closed state and the cover being closed,
   wherein the display unit of the electronic device displays information associated with the electronic device at a portion of the display unit that is exposed by the window in response to the window being in an open state.

9. The apparatus of claim 8, wherein the portion of the display unit exposed in response to the window being in an open state displays device information, the device information being selected from the group consisting of:
   information regarding a battery charge remaining of the electronic device;
   information regarding whether a battery of the electronic device is being charged; and
   information regarding arrival of one or more emails.

10. The apparatus of claim 8, further comprising a cable that selectively connects the electronic device and an external device, wherein the cable comprises a first connector for connection with the external device, the first connector being formed at the window, and a second connector for connection with an external input terminal of the electronic device.

11. The apparatus of claim 10, wherein the first connector is formed on a surface disposed on a side of the electronic device opposite the display unit in a state in which the window is closed and the first connector is exposed in a state in which the window is open.

12. The apparatus of claim 10, wherein the external device comprises a charging device.

13. The apparatus of claim 10, wherein the external input terminal is selected from the group consisting of:
- a dedicated external input terminal; and
- a general-purpose external input terminal.

14. The apparatus of claim 10, wherein the electronic device comprises a detector that detects that the window is in an open state in response to detecting that the external device is connected to the cable.

15. An electronic device comprising:
- a display unit disposed on at least one surface of the electronic device and to which a cover is selectively attachable, the cover comprising a cover assembly that closes to cover the display unit and opens to expose the display unit when the cover is attached to the electronic device, and a window of the cover assembly that exposes a portion of the display unit in response to the window being in an open state and the cover being closed, and covers the portion of the display unit in response to the window being in a closed state and the cover being closed, wherein the cover being selectively attachable to the electronic device comprises the cover being selectively attached to the electronic device or selectively detached from the electronic device;
- a detector that detects that the window is in the open state; and
- a controller that causes the display unit to display device information regarding the electronic device at the portion of the display unit exposed by the window in response to the window being in the open state.

16. The electronic device of claim 15, wherein the device information is selected from the group consisting of:
- information regarding a battery charge remaining of the electronic device;
- information regarding whether a battery of the electronic device is being charged; and
- information regarding the arrival of one or more emails.

17. The electronic device of claim 15, wherein:
- the cover comprises a cable that selectively connects the electronic device and an external device; and
- the cable comprises a first connector for connection with the external device, the first connector being formed at the window of the cover, and a second connector for connection with an external input terminal of the electronic device.

18. The electronic device of claim 17, wherein:
- the first connector is formed on a surface disposed on a side opposite the display unit in a state in which the window of the cover is closed, the first connector being exposed in a state in which the window of the cover is open; and
- the detector detects that the window is in an open state in response to detecting that the external device is connected to the cable.

19. The electronic device of claim 17, wherein the external device comprises a charging device.

20. The electronic device of claim 17, wherein the external input terminal is selected from the group consisting of:
- a dedicated external input terminal; and
- a general-purpose external input terminal.

* * * * *